(12) United States Patent
Matteson et al.

(10) Patent No.: US 8,110,029 B2
(45) Date of Patent: Feb. 7, 2012

(54) INTEGRATED MERCURY CONTROL SYSTEM

(75) Inventors: David J. Matteson, Avon, CT (US); James P. Sutton, South Windsor, CT (US); Rebecca L. Tobiasz, Suffield, CT (US); Martin J. Kozlak, Enfield, CT (US)

(73) Assignee: ALSTOM Technology Ltd, Baden (CH)

( * ) Notice: Subject to any disclaimer, the term of this patent is extended or adjusted under 35 U.S.C. 154(b) by 319 days.

(21) Appl. No.: 12/437,939

(22) Filed: May 8, 2009

(65) Prior Publication Data

US 2010/0282140 A1 Nov. 11, 2010

(51) Int. Cl.
*B01D 53/64* (2006.01)
*B01D 53/75* (2006.01)
*F23J 15/02* (2006.01)

(52) U.S. Cl. ............ 96/109; 55/341.1; 96/111; 96/116; 96/117; 423/244.01; 110/216; 222/575

(58) Field of Classification Search ............ 96/108–111, 96/115–117, 134; 95/107, 134, 137; 55/341.1; 423/210, 244.01, 244.08; 110/203, 216, 110/345; 222/566, 575
See application file for complete search history.

(56) References Cited

U.S. PATENT DOCUMENTS

| | | | |
|---|---|---|---|
| 5,623,402 A | 4/1997 | Johnson | |
| 5,711,785 A | 1/1998 | Maxwell | |
| 6,022,388 A | 2/2000 | Andersson et al. | |
| 6,521,021 B1 * | 2/2003 | Pennline et al. | 95/134 |
| 6,528,030 B2 * | 3/2003 | Madden et al. | 423/210 |
| 6,558,454 B1 * | 5/2003 | Chang et al. | 95/901 |
| 6,953,494 B2 * | 10/2005 | Nelson, Jr. | 95/134 |
| 7,117,046 B2 | 10/2006 | Boyden et al. | |
| 7,123,971 B2 | 10/2006 | Piche | |
| 7,398,652 B1 | 7/2008 | Kosvic et al. | |
| 7,600,479 B2 * | 10/2009 | Lissianski et al. | 110/345 |
| 2005/0039598 A1 * | 2/2005 | Srinivasachar et al. | 95/134 |
| 2005/0201914 A1 | 9/2005 | Ritzenthaler | |
| 2006/0045801 A1 | 3/2006 | Boyden et al. | |
| 2006/0048646 A1 | 3/2006 | Olson et al. | |
| 2009/0078177 A1 | 3/2009 | Wu et al. | |

FOREIGN PATENT DOCUMENTS

| | | |
|---|---|---|
| EP | 1 645 323 | 4/2006 |
| WO | WO 2007/020205 | 2/2007 |
| WO | WO 2008/130576 | 10/2008 |

OTHER PUBLICATIONS

PCT International Search Report and The Written Opinion of the International Searching Authority, dated Sep. 17, 2010—(PCT/US2010/025827).

* cited by examiner

*Primary Examiner* — Frank Lawrence, Jr.
(74) *Attorney, Agent, or Firm* — Lawrence P. Zale (57) ABSTRACT

An integrated system [1000] is described for reducing operating costs of power plants while keeping gaseous pollutants in exhaust flue gasses, such as Mercury (Hg), below acceptable limits. Controller [1800] monitors and controls operation of a scrubber [1300], activator injection system [1400], sorbent injection system [1500] and a filter [1600]. Scrubber [1300] provides a neutralizer to remove $SO_2$ emissions. Activator injection system [1400] provides and activator that increases affinity of the pollutant gasses for a sorbent. Sorbent injection system [1500] employs novel low friction injection lances [1590] that evenly distribute the sorbent particles. A filter [1600] collects the sorbent particles that cake onto filter bags [1620] that are periodically cleaned. A controller [1800] receives the costs of materials consumed and the filter bag life for the plant and performs an optimization of the multiple variables to minimize costs while keeping the pollutant emissions below a prescribed limit.

25 Claims, 8 Drawing Sheets

INTEGRATED MERCURY CONTROL SYSTEM

TECHNICAL FIELD

The present disclosure relates to a system for reducing gaseous pollutant emissions from a power plant, and more specifically an integrated optimization system for reducing gaseous pollutant emissions from a power plant while minimizing costs of plant operation.

BACKGROUND

Furnaces, such as commercial boilers, burn fuels that release gaseous pollutants, such as mercury into the atmosphere. Mercury condenses returns to the ground as a toxic contaminant. New regulations are proposed to greatly reduce the amount of mercury that can be released.

Devices have been employed that reduce the amount of mercury released. One such device disperses activated carbon particles into the flue gasses to adsorb the Mercury gasses.

When too much mercury is exiting the system, the system simply increases the amount of sorbent used. Sometimes other parameters that may be altered to achieve better results.

An activator is used in addition to a sorbent to decrease mercury emissions. Again, there are times when increasing the amount of activator used is not as effective as adjusting another input parameter.

In the past, there have been systems that optimized one or more parameters of the system. These however, did not take into account additional parameters that may be varied to adjust the emissions of mercury from a plant, and did not optimize all the parameters. They also did not optimize with respect to plant operation costs.

With the prior art systems, there may be additional use of sorbent or activator. This results in waste and additional plant operation costs.

Currently there is a need for a system that optimizes the important parameters, insures that gaseous pollutant emissions are below an acceptable set level and that minimized plant operation costs.

SUMMARY

The present invention may be embodied as An optimized pollutant removal system [1000] in a boiler system burning a fuel, functioning to reduce operating costs while maintaining pollutants of a flue gas stream below an acceptable limit comprising:

a scrubber [1300] for dispersing a neutralizer into the flue gas stream removing SOx gasses;

a sorbent injection subsystem [1500] having a sorbent chamber [1550] for receiving said flue gas stream, the sorbent injection system [1500] adapted to disperse sorbent particles within the flue gas stream at a defined rate, the sorbent particles adapted to adsorb gaseous pollutants;

a filter [1600] coupled to the sorbent chamber [1550] for filtering the sorbent particles having adsorbed gaseous pollutants out of the flue gases;

a stack [1700] coupled to the filter [1600] for releasing the filtered flue gases;

a stack sensor [1710] for monitoring an amount of gaseous pollutant exiting the stack [1710];

a controller [1800] coupled to the scrubber [1300], the sorbent injection subsystem [1500] and the stack sensor [1710] for reading the rate that neutralizer is provided into the flue gasses, the rate of the sorbent is dispersed by the sorbent injection subsystem, an amount of gaseous pollutant in the stack [1700], a unit cost of the neutralizer, the sorbent and for providing a signal adjusting the rate of neutralizer and sorbent dispersed to reduce said boiler operating costs while maintaining gaseous pollutant levels within predetermined acceptable levels.

The present invention may also be embodied as a controller [1800] for use in a boiler having a scrubber [1300], an activator system [1400], a sorbent injection system [1500], a filter [1600]), the controller [1800] adapted to:

monitor the scrubber [1300] operating parameters neutralizer material being consumed;

monitor activator system [1400] operating parameters and activator material consumed, monitor sorbent injection system [1500] operating parameters and sorbent material consumed;

monitor pollutant emission parameters, monitor opacity parameters in the stack [1700], calculate actuator parameters for the activator system [1400], scrubber [1300], sorbent injection system [1500] and filter [1600] corresponding to a minimum operating costs while maintaining emissions below a predetermined acceptable level, based upon the monitored parameters and the cost of material consumed.

The present invention also includes an injection lance [1590] extending in a general vertical direction for dispersing a powdered material into a flowing flue gas traveling generally horizontally, the injection lance [1590] comprising:

a plurality of conduits [1591-1599] each having:

a first end [1571-1579] for receiving said powered material, and a second end [1581-1589] for releasing powdered material into said flowing flue gas, at least two conduits [1591-1599] having different lengths, and the conduits attached together in a manner such that the first ends [1571-1579] are generally coplanar, and the second ends [1581-1589] are offset vertically from each other.

OBJECTS OF THE INVENTION

It is an object of the present invention to provide an interactive control system that monitors several parameters of the furnace and adjusts several inputs to the furnace to keep pollutant gas levels below an acceptable value, while minimizing plant-operating costs.

It is another object of the present invention to provide an interactive system that controls several aspects of the system to control pollutant gas emissions.

It is another object of the present invention to provide an interactive system that monitors and optimizes the absorptive material injected into the flue gasses to minimize pollutant gas emissions.

It is another object of the present invention to provide an interactive system that monitors and optimizes the amount of activator material injected onto the solid fuel to minimize mercury emissions.

It is another object of the present invention to provide an interactive system that monitors and optimizes both the absorptive material injected into the flue gasses and the activator material added to the solid fuel to minimize mercury emissions.

It is another object of the present invention to provide an interactive system that monitors and optimizes system functioning to minimize costs of materials used.

It is another object of the present invention to provide an interactive system that monitors and controls both the $SO_3$ and $SO_2$ emissions to facilitate mercury removal and reduce mercury emissions.

It is another object of the present invention to provide an interactive system that monitors and controls system functioning to maximize filter bag life.

It is another object of the present invention to inject sorbent material that is more resistant to clogging as compared with prior art injection systems.

BRIEF DESCRIPTION OF THE DRAWINGS

Referring now to the drawings, wherein like items are numbered alike in the various Figures.

DETAILED DESCRIPTION

Theory

Solid particles suspended in flowing flue gases have been known to be separated from the remaining flue gasses with the use of fabric filters and/or electrostatic particle filters. Fabric filters physically stop particles of a given size or larger from passing through the fabric to escape. The particles are collected from the outside of the filter then disposed.

Electrostatic filters precipitate solid particles out of the flue gases by using electrostatic attraction.

Gaseous pollutants are more difficult than particulate matter to remove from escaping flue gasses. Mercury (Hg) is present in many fuels, such as coal. When coal is burned, Hg is released into its gaseous phase. Hg is a toxic pollutant and should be removed from the flue gasses.

Adsorption of gaseous pollutants, such as Hg, are based upon a) proximity of the gaseous pollutant molecules to the adsorption particles; and b) excitation of the pollutant gas molecules.

One method of removing gaseous pollutants is to disperse a sorbent agent, such as activated carbon into the Hg gas. Activated carbon adsorbs Hg gas.

Proximity is the collective separation between the adsorbent particles the Hg gas molecules. This depends upon particle distribution in the volume. Greater proximity may be achieved by directing more sorbent material to regions where Hg converges. Greater distribution of sorbent near the Hg allows the particles to become available for adsorption of the Hg gas.

The amount of adsorption also is dependent upon the attraction between the molecules on the surface of the adsorbent particles and the Hg molecules. It has been known that treating the Hg gas with activators, such as Calcium Bromide ($CaBr_2$) and bromine, increase the affinity of Hg gas for the molecules on the surface of the adsorbent particles. This is referred to as activation of the Hg molecules.

Competing Molecules

Since Hg competes with other molecules for the active adsorption sites on the surface of the adsorbent particles, Hg adsorption increases with decreasing amount of competing molecules. $SO_2$ and $SO_3$ are created from burning fuels, especially coal. These molecules are also adsorbed into the adsorbent and compete for sites on the surface of the adsorbent particles. $SO_3$ is much more reactive with the sorbents as compared with $SO_2$. Therefore, minimizing the $SO_3$ concentration in the flue gas greatly increases Hg adsorption. Minimization of $SO_2$ also increases Hg adsorption, but not to the extent of minimizing $SO_3$. Therefore, one of the main goals is to minimize $SO_3$ in the flue gas to a low level, such as less than 10 parts per million (ppm).

Figure 1:
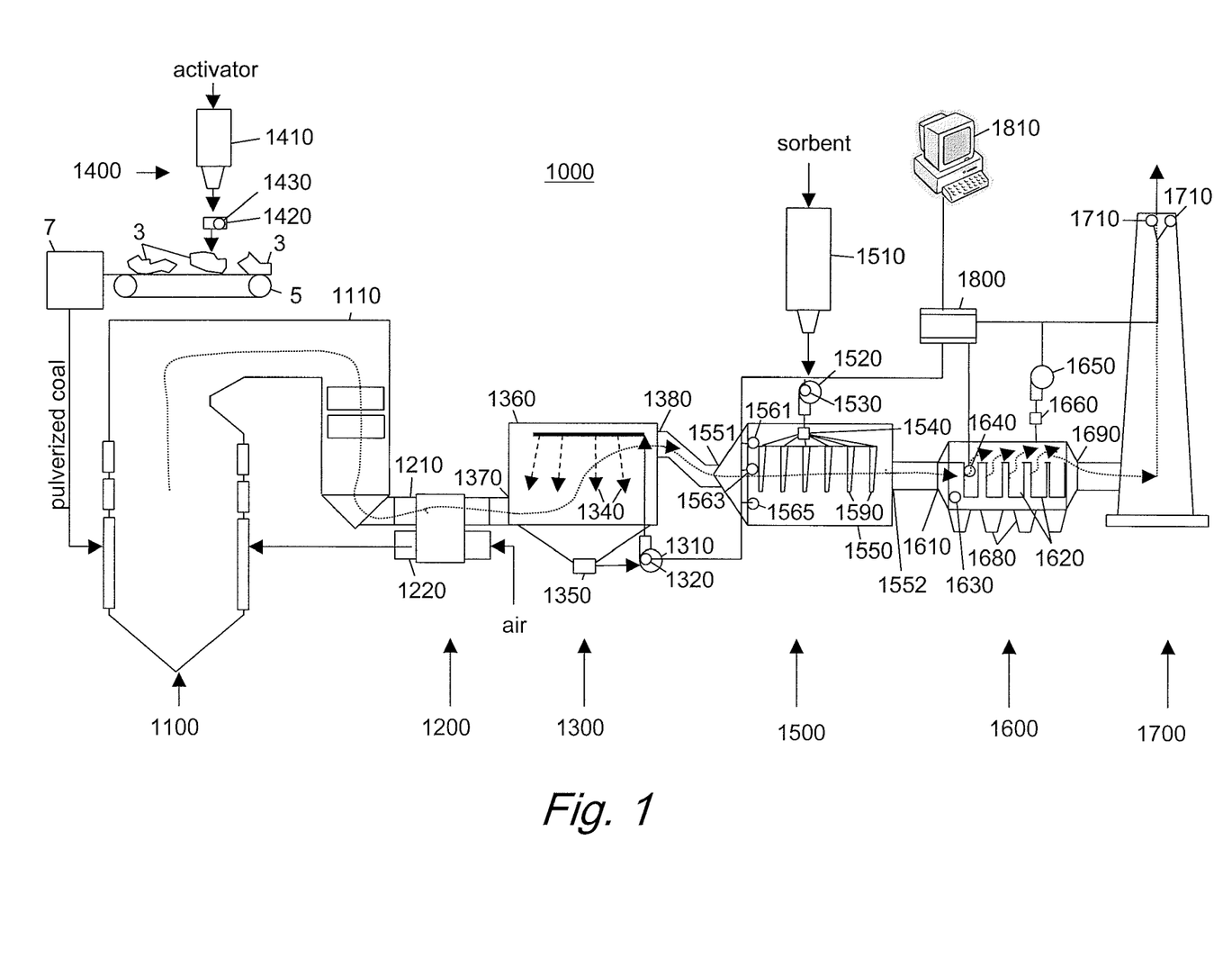
FIG. 1 is a simplified schematic diagram of a coal-fired boiler employing sorbent injection into the flue gasses that, that is optimized according to the present invention.

FIG. 1 is a simplified schematic system diagram of a coal-fired boiler 1000 employing sorbent injection into the flue gasses that is optimized according to the present invention.

Hot flue gasses pass through exhaust duct 1110 and into the flue gas side 1210 of heat exchanger 1200. Air enters the system 1000 and is preheated in preheat side 1220 of a heat exchanger 1200.

The hot flue gasses enter a scrubber 1300. A neutralizer, such as $CaCO_3$, is provided by blower 1310 into the flue gasses. The neutralizer removes the $SO_2$, $SO_3$ from the flue gasses. Excess neutralizer falls to a collection section 1350 that is collected for recirculation.

A sensor 1320 monitors the amount of neutralizer provided by blower 1310.

The flue gas then exits scrubber 1300 at outlet 1380 and passes into inlet 1551 of sorbent chamber 1550. This may be a duct, or it may be a chamber specifically designed for its use. A sorbent, such as activated carbon, is held in a silo 1510. Sorbent is passed to a sorbent pump 1520 that blows it into a distributor 1540. Distributor 1540 distributes the flowing sorbent to at least one injection lance 1590. Injection lance 1590 has a unique design that allows even distribution of sorbent throughout the sorbent chamber 1550. Since sorbent is used to adsorb gaseous Hg, it is important to spread out the particles to create a large effective surface area to capture as many Hg molecules as possible.

As discussed above, an activator may be used to increase the affinity of Hg molecules to the sorbent particles. One such way is to spray the activator onto the solid fuel being used. In this example, bulk coal 3 is placed on a conveyor 5. An activator in activator storage 1410 is passed to an activator flow controller 1420. This may be a pump or valve that can be controlled that meters a desired amount of activator and provides it to the bulk coal 3.

The activator and bulk coal 3 are then provided to a crusher 7 that pulverizes them into pulverized coal with activator, simply referred to as pulverized coal. The pulverized coal is provided to the boiler 1100 along with heated air for combustion.

An activator flow control 1420 may be a metering pump that is used to monitor the activator flow rate. This monitored information is used later in optimization.

The sorbent and activator adsorb the Hg gas and are passed with the flue gas to a filter 1600. This may be a fabric filter, an electrostatic filter, or other filter that is capable of filtering the sorbent and flyash out of the flue gasses. Flue gasses enter through the filter inlet 1610. They then pass from the outside of each filter bag to the inside. Once inside the filter bag, they are allowed to exit through the filter outlet 1690.

The filter 1600 removes the particulate matter from the flue gas. The sorbent, with the adsorbed Hg molecules and flyash are collectively referred to as a 'filter bed'. The filter bed accumulates on the outside surface of the filter bags 1620. The thickness of the filter bed is important in removing additional Hg molecules.

Sorbent Dispersion

As stated above, the dispersion of the activated sorbent has an effect on Hg removal efficiency. The more dispersion, the more surface area contact between the activated charcoal and the flue gasses. Therefore, it is important to provide maximum dispersion of the sorbent in the flue gasses to increase efficiency.

Figure 2:
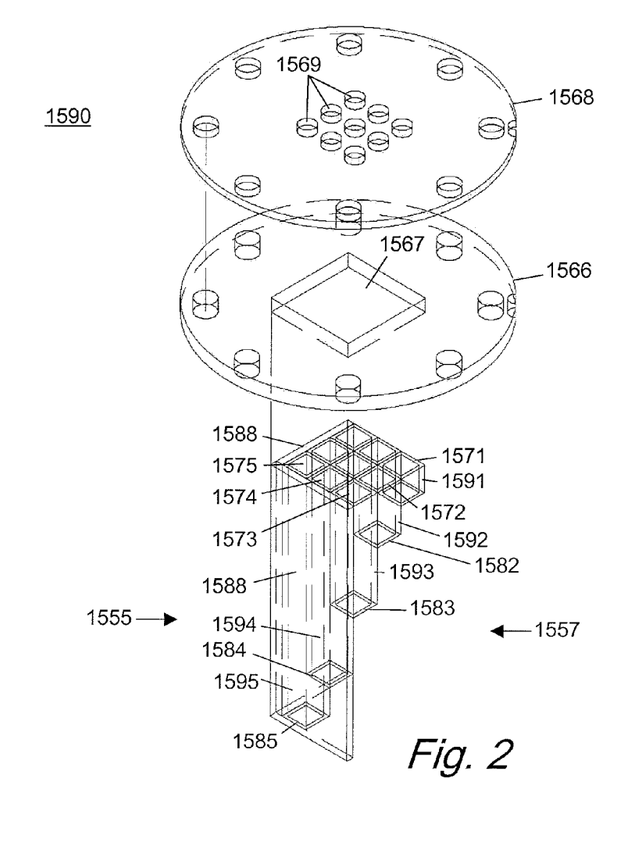
FIG. 2 is an exploded perspective view of one embodiment of an injection lance according to the present invention.

FIG. 2 is an exploded perspective view of one embodiment of an injection lance according to the present invention.

Figure 3:
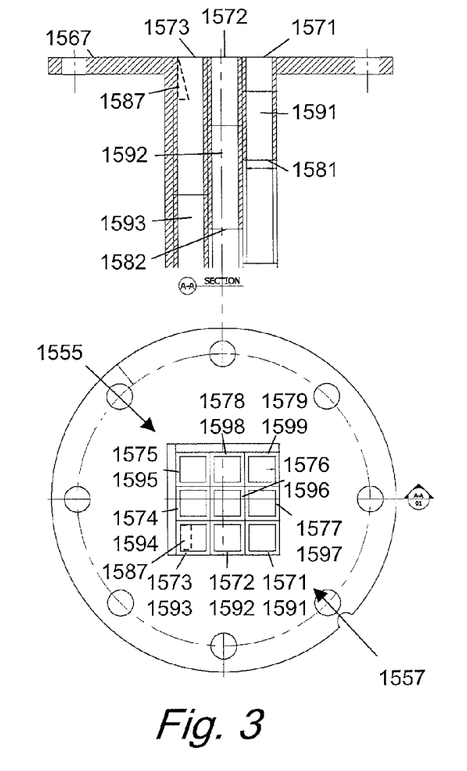
FIG. 3 is a plan view and side elevational view of a base plate and conduits of one embodiment of the injection lance shown in FIG. 2.

FIG. 3 is a plan view and side elevational view of a base plate and conduits of one embodiment of the injection lance shown in FIG. 2. The lance of the present invention will be described in connection with both FIGS. 2 and 3.

This lance has a 'skyscraper' shape wherein a number of elongated conduits 1591, 1592, 1593, 1594, 1595, 1596, 1697, 1598, and 1599 can be seen here. The conduits are fixed with respect to each other and fit within a central opening 1567 of a base plate 1566. The conduits 1591-1599 have least two having differing lengths. These are all substantially parallel to each other and are vertically aligned. They each have a first end opening 1571, 1572, 1573, 1574, 1575, 1576, 1577, 1578, and 1579 that is vertically higher than a second end opening 1581, 1582, 1583, 1584, 1585, 1586, 1587, 1588, and 1589.

The first ends are substantially aligned, causing the second ends to extend various lengths down the lance terminating at different vertical locations. Sorbent particles are provided into their first end openings 1571-1579. The sorbent particles travel through the length of the conduits and out the second end openings 1581-1589. Since these are aligned generally in a vertical direction, gravity partially pulls the particles down and out of the conduits 1591-1598. Since the particles exit at different vertical exit points, there is a greater distribution of particles over the sorbent chamber volume.

These conduits 1591-1599 are preferably straight since straight conduits exhibit the lowest resistance to flow. Also, the lances 1590 preferably have no narrowed sections. There is also little pressure required to pass the particles through conduits having these properties, since gravity is pulling the particles downward through the conduits.

The injections lances 1590 are aligned generally vertically having a forward edge meeting said oncoming flue gas stream.

A wear protector 1588, shown here as two flat strips meeting at an angled edge acts as the leading edge 1555 of the lance 1590. Flue gasses are directed at the lances 1590 first encounter the angled edge of the wear protector 1588. This protects the lances from the oncoming flue gasses. It reduces wear of the lances 1590 and provides rigid structural support.

Wear protector 1588, by its shape causes turbulence behind it facilitating the dispersion of adsorbent particles released from the trailing edge 1557 of the lance 1590. This turbulence near the trailing edge of injection lance 1590 further distributes the sorbent particles over the volume of sorbent chamber (1550 of FIG. 1).

The longest conduits 1595, 1594 are located near the leading edge 1555 with the shorter ones located near the trailing edge 1557 to provide a plurality of second end openings 1581, 1582, 1583, 1584 and 1585 on the trailing edge of the injection lances 1590.

Since the system employs a low-pressure distribution of the particles, smaller particles may be distributed which have increase surface area. The straight flow, low pressure conduits have no curves or angles and therefore significantly reduce amount of clumping of particles. This results in less clogging and reduced maintenance time and cost.

It is envisioned in this invention that the conduits 1591-1599 may alternatively have cross sectional shapes other than square or rectangular, be angled with respect to a vertical line, may include some curves, and/or may have one or more narrowed sections. These will reduce their performance of the lances 1590, but still remain functional and within the scope of this application.

Optionally, as shown in FIG. 3, each conduit may be 'tuned' to insure that there is the same resistance to flow. One or more tuning inserts 1587 can be inserted into selected conduits. These balance the flow among the conduits. Various sized tuning inserts 1587 may be used to properly adjust the flow resistance so that there would be an even distribution of particles. Since they are exposed to a great deal of erosion, they should be made of an erosion resistant material, such as ceramic.

Figure 4:
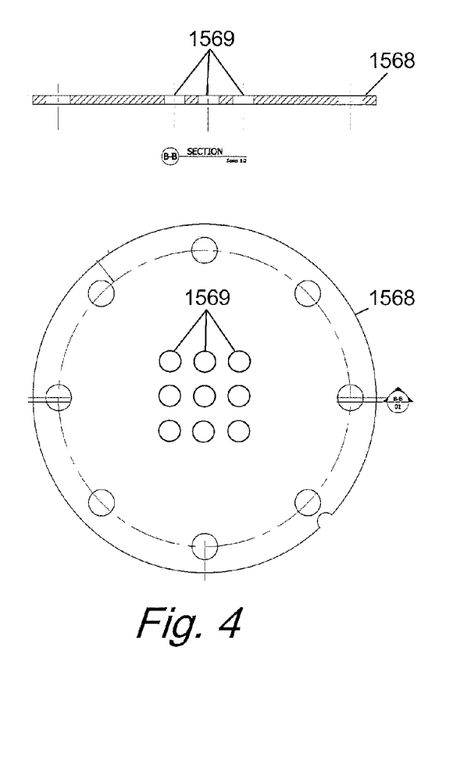
FIG. 4 is a plan view and side elevational view of a restrictor plate of one embodiment of the injection lance shown in FIG. 2.

FIG. 4 is a plan view and side elevational view of a restrictor plate 1568 of one embodiment of the injection lance shown in FIG. 2. The restrictor plate has holes 1569 designed to line up with the conduits 1591-1599. The holes 1569 are sized to more accurately control the amount of materials passing thorough the lances 1590.

Figure 5:
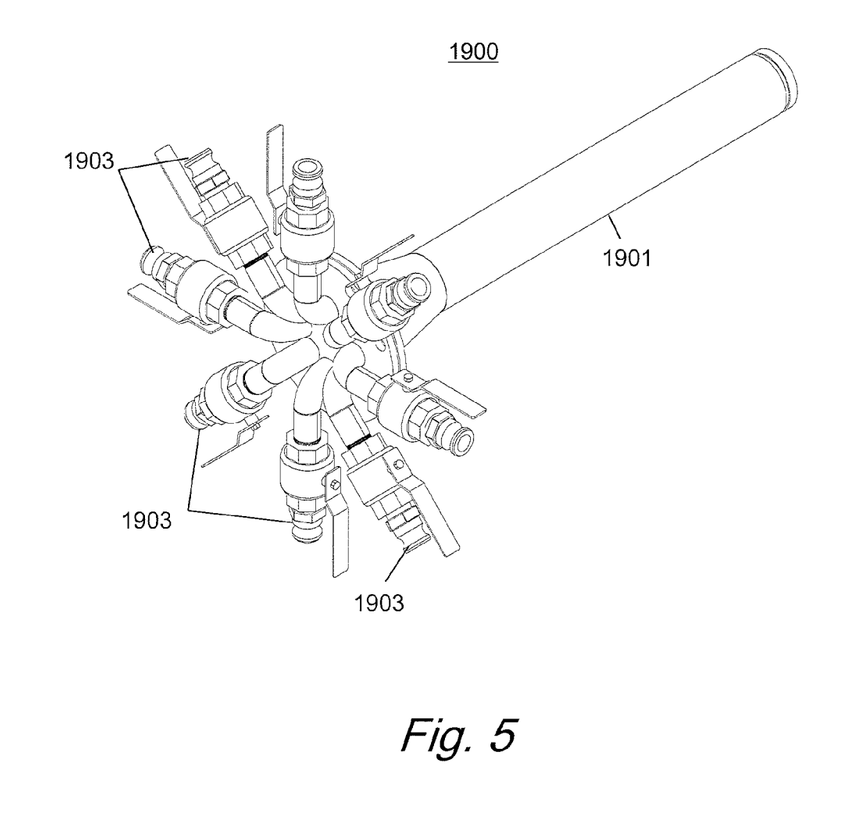
FIG. 5 is a perspective view of a splitter compatible with the present invention.

FIG. 5 is a perspective view of a splitter 1900 compatible with the present invention. Splitter 1900 has a main feed section 1901 that receives flowing air and the sorbent. The sorbent may have an activator in it. The flowing air and sorbent are split evenly into a plurality of lance feeds 1903. The lance feeds 1901 each connect to and feed an injection lance, not shown here.

Figure 6:
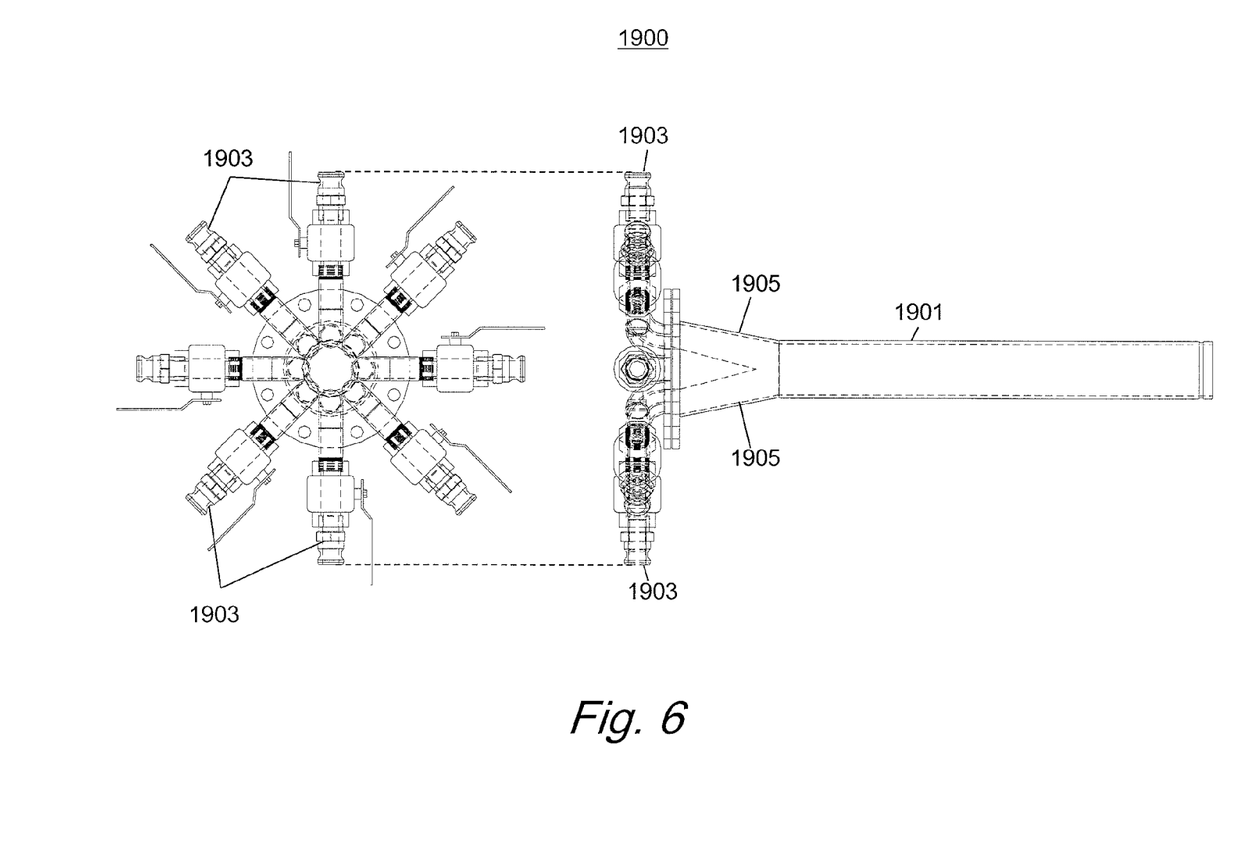
FIG. 6 shows both a side elevational view and a plan view of the bottom of the splitter shown in FIG. 5.

FIG. 6 shows both a side elevational view and a plan view of the bottom of the splitter 1900 shown in FIG. 5. Several branched pathways 1905 are visible. Each of these branched pathways 1905 leads to a different lance feed 1903. The splitter 1900 results in a device for evenly distributing air and sorbent in an even manner to all of the injection lances.

Control System

There have been systems that monitored and optimized a single aspect of the system. However, adjusting one parameter may have consequences on other aspects of the system. Therefore, it is important to monitor multiple aspects, weight them by their relative costs, then adjust several output parameters to minimize the plant operating costs.

The amount of neutralizer provided to the flue gas controls the amount of $SO_2$, $SO_3$ left in the flue gasses. The $SO_2$, $SO_3$ competes with the Hg for sites on the sorption particles, decreasing the amount of Hg adsorbed. Increasing the amount of limestone neutralizer decreases the amount of $SO_2$ and $SO_3$ molecules in the flue gas. However, too much neutralizer results in waste that adds to the cost of operating the plant and should also be minimized.

The present invention also functions to reduce waste, by optimizing the amount of sorbent material used. More sorbent results in a more concentrated dispersion in the sorbent chamber 1550. This result in more Hg adsorbed. However, too much sorbent results in additional unnecessary operation costs.

There should be enough activator provided to the system to properly activate the Hg molecules. However, additional activator should be eliminated to reduce waste.

Optimize Filter Bed Depth

Flyash and sorbent collects on the outside surface of fabric filters. This creates a 'filter bed'. The filter bed thickness increases over time as more sorbent and flyash collects. The Hg gas molecules must travel through the filter bed to exit the system. Thicker filter beds increasing the amount of contact that the Hg gas has with the adsorbent particles. The more contact, the greater the probability that the Hg gas molecules are adsorbed into the sorbent in the filter bed. However, the thicker the filter bed, the more resistance there is to flue gases exiting the system.

The filters are designed to be self-cleaning. U.S. Pat. Nos. 6,022,388 Andersson et al. Feb. 8, 2000 "Device for Cleaning Filter Elements", 6,749,665 B2 Bjarno et al. "Method When Cleaning A Filter", and International Patent Application PCT/SE92/00453, Applicant ABB Flakt collectively describe a device and method for removing or reducing the thickness of the filter beds on the fabric filters. These filter cleaning subsystems may be used with the present invention.

Different filter bed thickness causes different mercury adsorption levels. Therefore, it is best to monitor and adjust filter bed thickness to optimize mercury adsorption as well as flue gas flow. The filter bed thickness may be adjusted by adjusting the amount of sorbent being used and/or cleaning the filter bags.

Optimize Filter Bag Life

Figure 7:
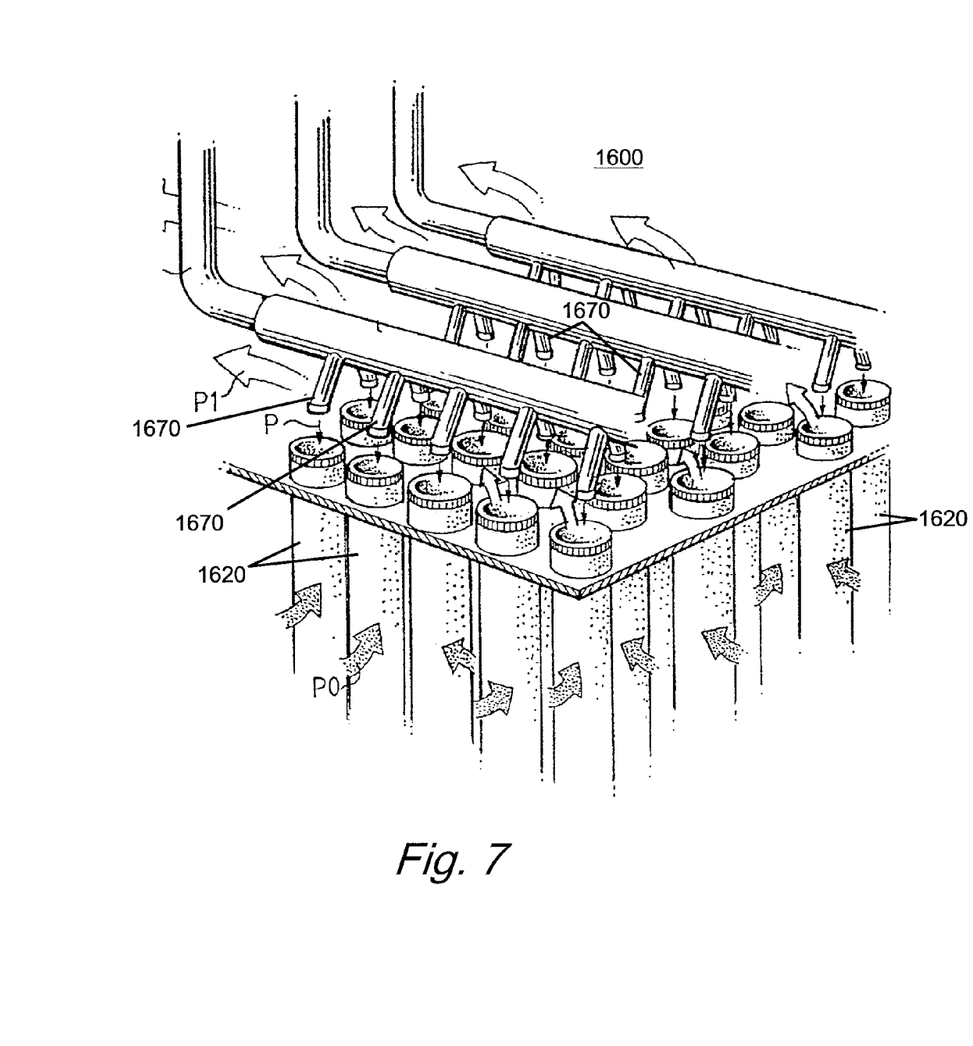
FIG. 7 is a partial perspective view of a fabric filter subsystem compatible with the present invention.

In the Andersson patent above, FIG. 1 is recreated here as FIG. 7. This illustrates how self-cleaning fabric filters function. Air enters through each of the filter bags 1620. Gases pass through the filter bags 1620, but particulate matter is stopped and collects on the surface of filter bags 1620.

The air, without suspended particles, exits as shown by the open arrows "P1". The particulate matter collects on the outside surface of the filter bags 1620 creating a filter bed. The thickness of this filter bed is referred to as "filter bed depth".

Once the filter bed depth has grown past a threshold level, it is removed. One such method is to activate an air pump (1650 of FIG. 1). This provides air-to-air valves (1660 of FIG. 1). When the air valves open, a burst of air is provided to the inside of filter bags 1620 from air nozzles 1670. Air nozzles 1670 blow air in a direction marked by arrow "P" that is opposite the normal flue gas flow direction. The air is quickly discharged into the filter bags 1620 to create a burst of air from inside which blows the accumulated filter bed off of the outside of the filter bags 1620. The filter bed falls to the bottom of the filter 1600 and is collected.

The more often bursts of air are discharged into the filter bags 1620, the shorter the lifespan of the filter bags 1620. Once the filter bags 1620 have become too worn, or break, they have to be replaced. This requires maintenance time and expenses are incurred for the service and materials. Also, there is lost production time if the system is shut down during the maintenance. Therefore, it is advantageous to how much life is left in a filter bag so that it may be replaced when another is being replaced if there is not much life left in the bag. This saves considerable maintenance costs.

Therefore, another goal is to optimize the frequency of air bursts provided to the filter to keep the filter functioning properly, maximize the filter bag life while keeping the Hg emissions within the acceptable limits.

Controller Inputs

Figure 8:
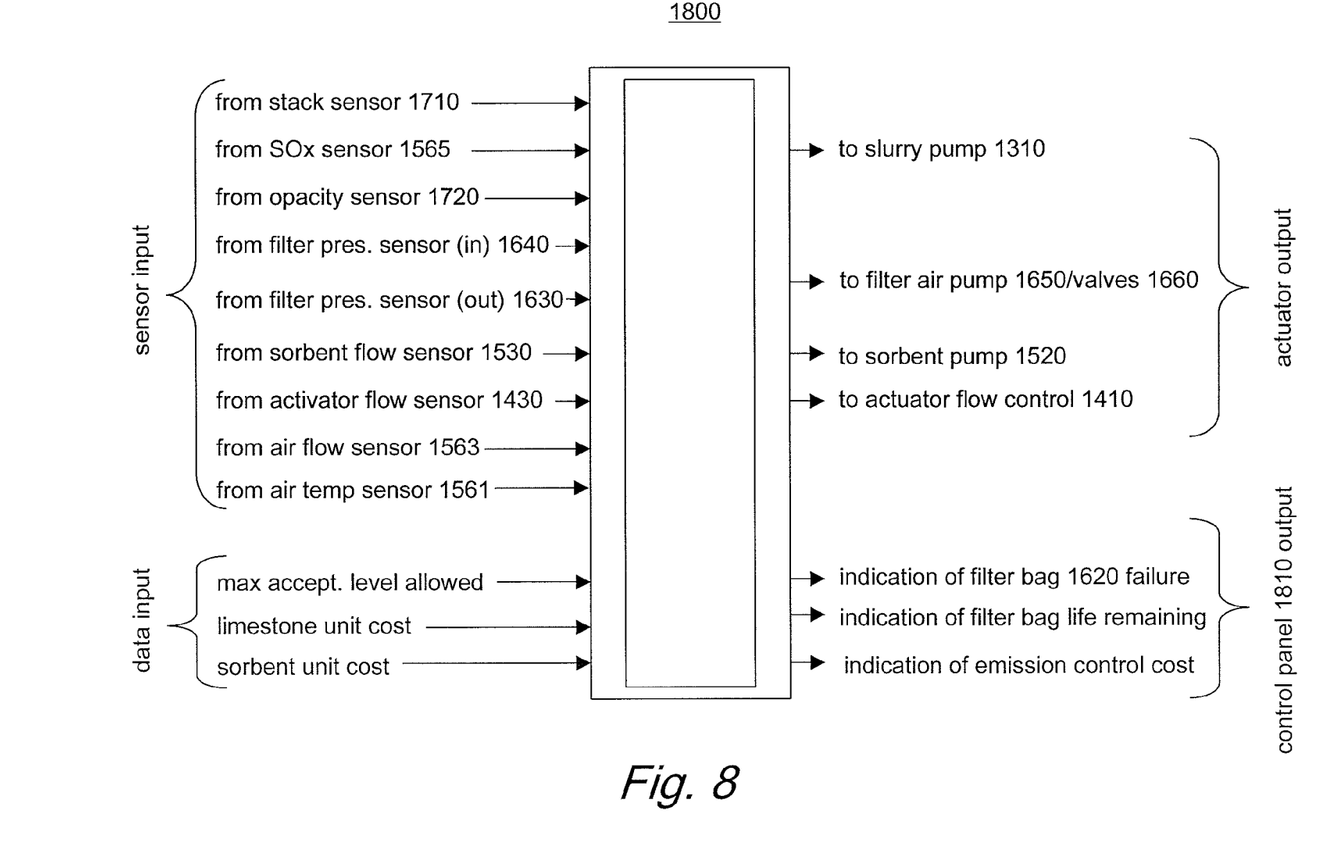
FIG. 8 is a schematic showing the inputs and outputs of one embodiment of a controller 1800 consistent with the present invention.

Referring both to FIGS. 1 and 8, to achieve the goals above, a controller 1800 monitors several system inputs and controls several system outputs.

The $SO_x$ levels are monitored by $SO_x$ sensors 1565 located at the inlet 1551 of sorbent chamber 1550. Since the $SO_x$ compete with Hg for the sorbent sites, the $SO_x$ should be removed prior to injection of the sorbent. This translates to the sorbent injection being downstream from the $SO_x$ removal portion of the system.

The air temperature and air flow rate are measured by air temperature sensor 1561 and air flow sensor 1563 at inlet 1551 of sorbent chamber 1550.

A sorbent flow sensor 1530 measures the rate at which sorbent is being fed into the system.

An activator flow sensor 1430 measures the rate at which an activator, such as calcium bromide, is being fed into the system.

An Hg emissions sensor 1710 on the stack 1700. In this example, the emissions sensor 1710 monitors Hg gas.

An opacity sensor 1720 in the stack 1700 measures the opacity of the flue gases being released from the stack 1700.

A inner filter sensor 1640 measures the pressure inside of the filter bags 1620. An outer filter sensor 1650 measures the pressure just outside of the filter. These sensors report the pressure readings to the controller 1800. Controller 1800 calculates a differential pressure indicating the amount of flue gas flow through the filter and the filter bed thickness.

The current cost for neutralizer per unit volume is input to the controller 1800, as is the cost for activator and the sorbent. Also, the cost of filter bags adjusted for their usable life are provided to controller 1800. These will be used to calculate the actual operating costs for a plant.

Controller Outputs

The controller 1800 reads data from the input sensors, and uses the data provided to it, to determine the combination of outputs that will minimize operating costs while keeping emissions within the acceptable limits.

The calculations are performed by a controller 1800 according to known methods of reading in data from one or more sensor and providing output signals to one or more actuators to create a monitored output less than a threshold level.

This is also described in U.S. Pat. No. 7,117,046 B2 Boyden et al., Oct. 3, 2006 entitled "Cascaded Control of an Average Value of A Process Parameter To A Desired Value", which is hereby incorporated by reference as if set forth in its entirety herein.

Similar parameter optimization systems are described in U.S. Pat. Nos. 7,398,652 B1 Kosvic et al., Jul. 15, 2008 "System for Optimizing a Combustion Heating Process", 7,123,971 B2 Piche, Oct. 17, 2006 "Non-Linear Model With Disturbance Rejection" and/or 5,623,402 Johnson Apr. 22, 1997 "Multi-Channel Inverse Control Using Adaptive Finite Impulse Response Filters".

Controller 1800 reads the input data from the sensors. It then calculates a trim signal for neutralizer blower 1310 to adjust the amount of neutralizer provided to the flue gasses in scrubber 1300 to provide the maximize SOx removal while not wasting the neutralizer. SOx should be minimized since they affect the ability of the sorbent to function.

The Controller 1800 calculates from the current cost of the sorbent, activator and neutralizer, and the flow rates of sorbent, activator, the additional amounts of neutralizer to be used and the timing to pulse the filter bags 1620 to keep the Hg emissions within the acceptable limits for the lowest operating cost.

Controller operates sorbent pump 1520 to provide the calculated sorbent flow rate.

Controller 1800 runs the activator flow control 1420 to provide the calculated activator flow rate.

Controller 1800 also provides a pulse signal to pulse air valves 1660 of filter 1600 to maintain the optimum filter bed depth.

Based upon the number of times that the filter bags 1620 have been cleaned, the pressures measured inside and outside of the filer bags 1620, and the opacity measured in the stack 1700, an estimation of the remaining filter bag life is determined. This estimation is calculated by controller 1800 and provided to a plant operator on a user interface 1810.

Based upon the pressures measured inside and outside of the filer bags 1620, and the opacity measured by the opacity sensor 1720 in the stack 1700, a determination is made that the filter bag 1640 failed. If it has, an indication is provided to the plant operator on user interface 1810.

The Controller 1800 interactively calculates from the current cost of the sorbent, activator and neutralizer, and the actual flow rates of sorbent, activator, the additional amounts of neutralizer to be used and the timing to pulse the filter bags 1620 the actual costs to keep the Hg emissions within the acceptable limits. These costs are provided to the plant operator on the user interface 1810.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. An optimized pollutant removal system [1000] in a boiler system burning a fuel, functioning to reduce operating costs while maintaining pollutants of a flue gas stream below an acceptable limit comprising:
    a scrubber [1300] for dispersing a neutralizer into the flue gas stream removing $SO_x$ gasses;
    a sorbent injection subsystem [1500] having a sorbent chamber [1550] for receiving said flue gas stream, the sorbent injection system [1500] adapted to disperse sorbent particles within the flue gas stream at a defined rate, the sorbent particles adapted to adsorb gaseous pollutants;
    a filter [1600] coupled to the sorbent chamber [1550] for filtering the sorbent particles having adsorbed gaseous pollutants out of the flue gases;
    a stack [1700] coupled to the filter [1600] for releasing the filtered flue gases;
    a stack sensor [1710] for monitoring an amount of gaseous pollutant exiting the stack [1710];
    a controller [1800] coupled to the scrubber [1300], the sorbent injection subsystem [1500] and the stack sensor [1710] for reading the rate that neutralizer is provided into the flue gasses, the rate of the sorbent is dispersed by the sorbent injection subsystem, an amount of gaseous pollutant in the stack [1700], a unit cost of the neutralizer and the sorbent, and for providing a signal adjusting the rate of neutralizer and sorbent dispersed to reduce said boiler operating costs while maintaining gaseous pollutant levels within predetermined acceptable levels.

2. The optimized pollutant removal system [1000] of claim 1, further comprising:
    an activator injection subsystem [1400] for dispersing activator particles within the flue gas stream in the sorbent chamber [1550] at a defined rate, the activator particles chosen to activate the sorbent to increase its affinity for flue gas pollutants; and
    the controller [1800] is further adapted to receive the unit cost of activator, and the rate of activator being used and takes these parameters into account to reduce said boiler system [1000] operating costs while maintaining pollutants in the flue gas stream within the acceptable limits.

3. The optimized pollutant removal system [1000] of claim 1, wherein the filter is coupled to controller [1800], the controller receiving filter bag costs, and filter bed depth, and the number of times in which the filter has been cleaned using current filter bags and takes these parameters into account to reduce said boiler operating costs while maintaining pollutants in the flue gas stream within the acceptable limits.

4. The optimized gaseous pollutant removal system [1000] of claim 1 wherein sorbent injection subsystem [1500] comprises:
    a plurality of sorbent injection lances [1590] for evenly dispersing sorbent particles provided to them,
    a source [1510] of sorbent particles,
    a sorbent pump [1520] for pumping the sorbent particles from the source [1510] to the injection lances [1590];
    a sorbent flow sensor [1530] coupled to the sorbent pump [1520] for measuring the rate of sorbent provided to the injection lances [1590].

5. The optimized gaseous pollutant removal system [1000] of claim 2 wherein activator injection subsystem comprises:
    a source [1410] of activator,
    an activator control [1420] for providing the activator to the system [1000];
    an activator use sensor [1430] for measuring the rate of activator flow rate.

6. The gaseous pollutant removal system [1000] of claim 1, wherein SOx sensors are located in the sorbent chamber [1550] to measure the amount of $SO_x$.

7. The optimized gaseous pollutant removal system [1000] of claim 1, a neutralizer flow sensor [1320] to measure the rate at which neutralizer being is being provided to a scrubber tank [1360].

8. The optimized gaseous pollutant removal system [1000] of claim 4, wherein the injection lance [1590] comprises:
    a plurality of elongated conduits [1591-1599] of varying lengths each vertically aligned and attached substantially parallel to each other, each conduit having a first open end [1571-1579] vertically higher than a second open end [1581-1589];
    the first ends [1571-1579] substantially aligned and all are adapted to receive sorbent particles,
    at least two of the second open ends [1581-1589] ending at a different vertical position;
    the conduits [1591-1599] connecting the open ends to allow the sorbent to fall from the first open ends [11571-1579] through the conduits [1591-1599] and out of the second ends [1581-1589], thereby dispersing the sorbent particles.

9. The optimized gaseous pollutant removal system [1000] of claim 8 wherein:
    the injection lances first ends [1571-1579] are aligned generally vertically having a leading side [1555] meeting said flue gas stream, and a trailing side [1557], wherein the longest conduits are located near the leading side [1555] with the shorter ones located near the trailing side [1557] to provide a plurality of open second ends [1581-1589] on the trailing side [1557] of the injection lances [1590], the injection lances [1590] shaped such that said flue gas stream first encounters the leading side [1555] and travels around the injection lance [1590] creating turbulence on the trailing side [1557] near the injection lance second ends [1581-1589], thereby further distributing the sorbent particles.

10. The optimized gaseous pollutant removal system [1000] of claim 1, further comprising:
a user interface [1810] for supplying information to controller [1800] and for receiving and displaying information provided to it.

11. The optimized gaseous pollutant removal system [1000] of claim 10, wherein the controller [1800] is adapted to monitor filter bags [1620] and interactively display on user interface [1810] an alert indicating a filter bag failure.

12. The optimized gaseous pollutant removal system [1000] of claim 11, wherein the controller [1800] is further adapted to monitor each time filter bags [1620] have been cleaned, estimates filter bag life remaining for the filter bags [1620] and display this information on the user interface [1810].

13. The optimized gaseous pollutant removal system [1000] of claim 10, wherein the controller [1800] and user interface [1810] are adapted to interactively calculate and display instantaneous costs of operating the gaseous pollutant removal system [1000].

14. The optimized gaseous pollutant removal system [1000] of claim 1, wherein an activator is provided to sorbent chamber [1550].

15. The optimized gaseous pollutant removal system [1000] of claim 14, wherein said activator is provided to said fuel provided to the boiler.

16. The optimized gaseous pollutant removal system [1000] of claim 14, wherein said activator is provided to the boiler along with said fuel.

17. An injection lance [1590] extending in a general vertical direction for dispersing a powdered material into a flowing flue gas traveling generally horizontally, the injection lance [1590] comprising:
a plurality of conduits [1591-1599] each having:
a first end [1571-1579] for receiving said powered material, and
a second end [1581-1589] for releasing powdered material into said flowing flue gas,
at least two conduits [1591-1599] having different lengths, and
the conduits attached together in a manner such that the first ends [1571-1579] are generally coplanar, and the second ends [1581-1589] are offset vertically from each other.

18. The injection lance [1590] of claim 17 wherein:
the longer conduits [1591-1599] arranged near a leading edge [1555] which meets said flowing flue gas and the shorter conduits [1591-1599] arranged near a trailing edge [1557] away from the flowing flue gas creating turbulence at the trailing edge [1557], such that as powdered material exits the second ends [1581-1589] of the conduits at trailing edge [1557], it is dispersed by the turbulence.

19. The injection lance [1590] of claim 17 further comprising:
a wear protector [1588] covering and protecting the leading edge [1555] of injection lance [1590].

20. A controller [1800] for use in a boiler having a scrubber [1300], an activator system [1400], a sorbent injection system [1500], a filter [1600]), the controller [1800] adapted to:
monitor the scrubber [1300] operating parameters and neutralizer material being consumed;
monitor activator system [1400] operating parameters and activator material consumed,
monitor sorbent injection system [1500] operating parameters and sorbent material consumed;
monitor pollutant emission parameters,
monitor opacity parameters in the stack [1700],
calculate actuator parameters for the activator system [1400], scrubber [1300], sorbent injection system [1500] and filter [1600] corresponding to a minimum operating costs while maintaining emissions below a predetermined acceptable level, based upon the monitored parameters and the cost of material consumed.

21. The controller [1800] of claim 20 wherein the controller [1800] is further adapted to:
monitor filter [1600] operating parameters and filter bag life consumed;
use the monitored filter bag life consumed in its calculation of minimum operating costs and calculation of actuator parameters.

22. The controller [1800] of claim 20, further adapted to:
actuate at least one of the activator system [1400], scrubber [1300], the sorbent injection system [1500], the filter [1600] according to their calculated actuator parameters to result in minimized operating costs while keeping emissions below an acceptable limit.

23. The controller [1800] of claim 20 wherein the actuator parameters are defined as:
activator flow rate for the activator system [1400],
neutralizer flow rate for the scrubber [1300],
sorbent flow rate for the sorbent injection system [1500],
filter bag cleaning frequency for the filter [1600].

24. The controller [1800] of claim 20, wherein it is further adapted to:
receive updated costs of consumed material and filter bag life,
employ the updated cost in calculating actuator parameters for minimizing operating costs while keeping emissions below the predetermined acceptable level.

25. The controller [1800] of claim 20, wherein it is further adapted to:
receive updated acceptable emission levels,
employ the acceptable emission levels in calculating actuator parameters for minimizing operating costs while keeping emissions below the new acceptable level.

* * * * *